June 11, 1929.  L. CASALE  1,716,813
PROCESS FOR THE PRODUCTION OF HYDROGEN NITROGEN MIXTURES
Filed June 15, 1927
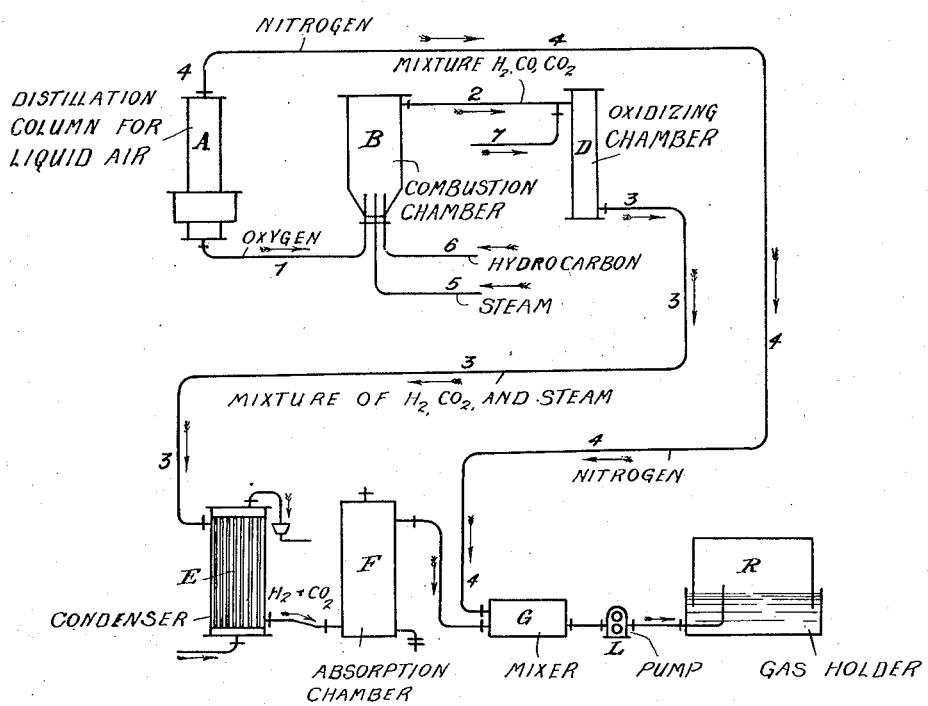
Inventor:
Luigi Casale,
    Deceased.
By
Maria Casale-Sacchi,
    Administratrix.
by
Marks Clerk
ATTORNEYS Patented June 11, 1929.

1,716,813

UNITED STATES PATENT OFFICE.

LUIGI CASALE, DECEASED, LATE OF ROME, ITALY, BY MARIA CASALE-SACCHI ADMINISTRATRIX, OF RAPALLO, GENOA, ITALY.

PROCESS FOR THE PRODUCTION OF HYDROGEN-NITROGEN MIXTURES.

Application filed June 15, 1927, Serial No. 198,971, and in Italy June 24, 1926.

The preparation of hydrogen starting from hydrocarbons is effected by means of an incomplete combustion of hydrocarbons which converts into carbon monoxide the carbon contained in the same. Said operation is generally performed using air or oxygen mixed with steam, so that a part of the oxygen necessary for the incomplete combustion of the hydrocarbons is supplied from water which is decomposed. The hydrogen yield of the operation is thus considerably increased.

But the hydrogen obtained is always mixed with considerable quantities of carbon monoxide and could not be used without subjecting it to long and costly operations of purification.

A process has now been invented by means of which it is possible to produce economically a mixture of hydrogen and nitrogen suitable for the synthesis of ammonia, starting from liquid air and hydrocarbons.

In the annexed drawing there is represented as example a scheme of plant suitable for performing this process; of course, the invention is not limited to the annexed scheme, but it includes also analogous appliances adapted to effect this process.

Refering to the drawing, A represents a column for the distillation of liquid air. The liquid or gaseous oxygen escaping from the column is sent to apparatus B where occurs, in presence of steam, the incomplete combustion of the hydrocarbons that is, the substantially complete conversion of the carbons in the hydrocarbons into carbon monoxide which are introduced in the apparatus B through a suitable duct. Thus, from the apparatus B issues a mixture of hydrogen, carbon monoxide, carbon dioxide and steam, which, after possible addition of a further quantity of steam, is sent to apparatus D where the carbon monoxide is oxidized according to the reaction:

$$CO + H_2O = CO_2 + H_2$$

and in this manner a mixture of hydrogen, carbon dioxide and steam issues from the apparatus D.

Said mixture is cooled in a cooler E from which issues a mixture of hydrogen and carbon dioxide. The carbon dioxide is removed from the latter mixture; the removal can be performed by any of the methods commonly used for this purpose, namely absorption with caustic alkalies, or with ammonia solutions, or with calcium hydrate or else by dissolving the carbon dioxide in water under pressure. The layout of the apparatus to be used for this purpose is schematically represented in Fig. F.

The gas leaving F, and which consists of hydrogen, enters a container G where it is mixed with nitrogen coming from A, and the mixture which in this manner is brought to have the composition $N_2 + 3H_2$, is suctioned by means of a blower L, which sends it to a gas holder R.

When, instead of pure oxygen, oxygen containing nitrogen is employed, the gas leaving F will be a mixture of hydrogen and nitrogen which it is possible to bring to the stochiometric ratio required for ammonia synthesis by means of an addition of nitrogen in G.

Having now particularly described and ascertained the nature of the said invention, and in what manner the same is to be performed, what is claimed is:

1. An improved process for the preparation of mixtures of nitrogen and hydrogen suitable for the synthesis of ammonia, which comprises distilling liquid air to obtain gaseous nitrogen, conveying the residual oxygen into a combustion chamber, converting a hydrocarbon into carbon monoxide and hydrogen with the aid of said oxygen and steam, converting the carbon monoxide into carbon dioxide, removing the carbon dioxide, and adding the gaseous nitrogen to the hydrogen thus obtained.

2. An improved process for the preparation of mixtures of nitrogen and hydrogen suitable for the synthesis of ammonia, which comprises distilling liquid air to obtain gaseous nitrogen, conveying the residual oxygen into a combustion chamber, converting a hydrocarbon into carbon monoxide and hydrogen with the aid of said oxygen and steam, adding a further amount of steam and converting the carbon monoxide into carbon dioxide, removing the carbon dioxide and adding the gaseous nitrogen to the hydrogen thus obtained.

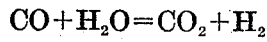
MARIA CASALE-SACCHI,
*Administratrix of Luigi Casale, Deceased.*